(12) United States Patent
McKenzie

(10) Patent No.: US 9,744,489 B2
(45) Date of Patent: Aug. 29, 2017

(54) PHASE SEPARATOR USING PRESSURE DIFFERENTIAL

(71) Applicant: Robert McKenzie, Chestermere (CA)

(72) Inventor: Robert McKenzie, Chestermere (CA)

( * ) Notice: Subject to any disclaimer, the term of this patent is extended or adjusted under 35 U.S.C. 154(b) by 176 days.

(21) Appl. No.: 14/339,511

(22) Filed: Jul. 24, 2014

(65) Prior Publication Data

US 2016/0008751 A1 Jan. 14, 2016

Related U.S. Application Data

(60) Provisional application No. 62/023,294, filed on Jul. 11, 2014.

(51) Int. Cl.
| | | |
|---|---|---|
| *B01D 45/00* | (2006.01) | |
| *B01D 45/08* | (2006.01) | |
| *B01D 45/16* | (2006.01) | |
| *B01D 21/00* | (2006.01) | |
| *B01D 17/02* | (2006.01) | |
| *B04C 3/00* | (2006.01) | |

(52) U.S. Cl.
CPC .......... *B01D 45/08* (2013.01); *B01D 17/0211* (2013.01); *B01D 21/0012* (2013.01); *B01D 45/16* (2013.01); *B04C 3/00* (2013.01)

(58) Field of Classification Search
CPC .... B01D 45/16; B01D 21/0012; B01D 21/26; B01D 17/0211; B01D 45/08; B04C 3/00
See application file for complete search history.

(56) References Cited

U.S. PATENT DOCUMENTS

| | | | |
|---|---|---|---|
| 1,066,704 A | | 7/1913 | Brassert |
| 2,058,044 A | * | 10/1936 | Spencer ............. B01D 17/0211 |
| | | | 210/533 |
| 2,193,209 A | * | 3/1940 | Sandberg ............... B01D 45/16 |
| | | | 55/355 |
| 2,229,860 A | | 1/1941 | McCurdy |
| 2,300,129 A | | 10/1942 | McCurdy |
| 2,346,005 A | | 4/1944 | Bryson |
| 2,574,370 A | | 11/1951 | Bailey |

(Continued)

FOREIGN PATENT DOCUMENTS

| | | |
|---|---|---|
| CA | 1096814 A1 | 3/1981 |
| CA | 2270152 A1 | 8/1998 |

(Continued)

*Primary Examiner* — Dung H Bui
(74) *Attorney, Agent, or Firm* — Davis & Bujold PLLC; Michael J. Bujold

(57) ABSTRACT

A separator for a gas stream has a horizontal tank with a fluid inlet, a fluid outlet and a flow path along the inside of the horizontal tank. A flow barrier is disposed within the tank between the inlet and the outlet. One or more sets of liquid ports are in fluid communication with the tank and positioned at a bottom surface of the tank. Each set of liquid outlets has a first port and a second port. The first port is positioned upstream along the flow path relative to the second port. A fluid passage is in fluid communication with the first port and the second port. The fluid passage defines a secondary flow path adjacent to the horizontal tank, where the first port acts as a draft inlet to the secondary flow path and the second port acts as a draft outlet from the secondary flow path to the tank.

7 Claims, 4 Drawing Sheets

(56) References Cited

U.S. PATENT DOCUMENTS

| | | | |
|---|---|---|---|
| 2,657,760 A * | 11/1953 | Glasgow | B01D 17/0211 96/168 |
| 2,799,645 A * | 7/1957 | Musgrove | B01D 12/00 210/167.31 |
| 2,812,034 A | 11/1957 | McKelvey, Jr. | |
| 2,910,136 A * | 10/1959 | Valliant | B01D 45/02 55/320 |
| 3,300,951 A | 1/1967 | Heimbach et al. | |
| 3,558,482 A * | 1/1971 | Young | B01D 17/0202 210/265 |
| 3,577,336 A * | 5/1971 | Shirley | B01D 17/0202 204/665 |
| 3,713,279 A * | 1/1973 | Moore | B01D 45/16 55/319 |
| 3,822,533 A | 7/1974 | Oranje | |
| 3,955,948 A | 5/1976 | Campolong | |
| 4,012,207 A * | 3/1977 | Jones | B01D 17/0211 95/253 |
| 4,133,771 A * | 1/1979 | Pielkenrood | B01D 17/0211 210/513 |
| 4,141,705 A | 2/1979 | Campolong | |
| 4,179,273 A | 12/1979 | Montusi | |
| 4,180,391 A | 12/1979 | Perry, Jr. et al. | |
| 4,187,089 A * | 2/1980 | Hodgson | B01D 45/18 55/396 |
| 4,255,174 A | 3/1981 | Simpson | |
| 4,435,196 A * | 3/1984 | Pielkenrood | B01D 17/00 96/184 |
| 4,622,048 A | 11/1986 | Roberts et al. | |
| 4,769,050 A | 9/1988 | Shaw et al. | |
| 4,978,373 A | 12/1990 | Endacott | |
| 5,064,448 A * | 11/1991 | Choi | B01D 17/00 55/345 |
| 5,503,753 A * | 4/1996 | Woodall | E03F 7/103 210/241 |
| 5,512,088 A | 4/1996 | McKenzie | |
| 5,525,133 A | 6/1996 | Haukeness | |
| 5,919,284 A * | 7/1999 | Perry, Jr. | B01D 45/02 55/319 |
| 6,187,079 B1 * | 2/2001 | Bridger | B01D 17/00 95/253 |
| 6,315,898 B1 * | 11/2001 | Bull | B01D 17/0211 210/187 |
| 6,419,730 B1 | 7/2002 | Chavez | |
| 6,572,687 B2 * | 6/2003 | Slaymaker | B01D 53/261 34/80 |
| 6,752,845 B2 | 6/2004 | Haland | |
| 6,984,260 B2 | 1/2006 | Atkinson | |
| 7,691,185 B2 | 4/2010 | Darke et al. | |
| 7,799,106 B2 | 9/2010 | Rother et al. | |
| 7,931,740 B2 | 4/2011 | Al-Alusi et al. | |
| 8,226,742 B2 | 7/2012 | Abrand et al. | |
| 8,470,080 B1 * | 6/2013 | Ball, IV | B01D 17/0211 95/24 |
| 2007/0220850 A1 | 9/2007 | Thompson | |
| 2011/0048696 A1 | 3/2011 | Holte | |
| 2013/0075338 A1 * | 3/2013 | Murtagh | B01D 17/0205 210/703 |
| 2013/0255205 A1 | 10/2013 | McKenzie | |
| 2013/0255206 A1 | 10/2013 | Mckenzie | |
| 2015/0283481 A1 * | 10/2015 | Akdim | B04C 3/06 95/261 |
| 2016/0096129 A1 * | 4/2016 | Kochubei | B01D 45/16 95/269 |

FOREIGN PATENT DOCUMENTS

| | | |
|---|---|---|
| EP | 0344749 A2 | 12/1989 |
| GB | 303599 A | 1/1929 |
| WO | 9217260 A1 | 10/1992 |
| WO | 9835744 A1 | 8/1998 |
| WO | 2006132527 A1 | 12/2006 |

* cited by examiner

PHASE SEPARATOR USING PRESSURE DIFFERENTIAL

TECHNICAL FIELD

This relates to a liquid/gas separator, such as may be used to separate liquid and gases in a stream of production fluids from a hydrocarbon well.

BACKGROUND

In order to process production fluids from a hydrocarbon well, it is often necessary to separate the various phases, such as liquid and gases. The separation strategies will depend on the type of well and the composition of the production fluids. However, generally speaking there will be sand, water liquid hydrocarbons, and gas hydrocarbons. Small amounts of other components may be present as well but are not considered here.

In fluid streams that are primarily gas, strategies are often used to knock out the liquid from the gas stream. One common apparatus is a horizontal tank that is filled with particulate matter, such as gravel, and that has alternating baffles to increase turbulence and increase the flow path. Referring to FIG. 4, a prior art separator 100 is shown, where a gas stream flows into an inlet 102 of separator 100. Separator 100 includes vertical baffles 104 and is at least partially filled with particulate matter (not shown). Vertical baffles 104 increase the flow path of the gas stream, come into contact with the gas stream, and redirect the gas stream to create turbulence, each of which reduces the amount of moisture in the gas stream. Baffles 104 generally alternate between being open on the top or bottom of separator 100. Fluids are collected at the bottom of the tank and removed via a liquid outlet 106. The gas stream then exits via outlet 108.

SUMMARY

According to an aspect, there is provided a separator for a gas stream comprising a horizontal tank having a fluid inlet, a fluid outlet spaced horizontally along the tank from the fluid inlet, and a flow path defined by the horizontal tank between the fluid inlet and the fluid outlet. A flow barrier is disposed within the tank and distributed along the flow path between the inlet and the outlet. One or more sets of liquid ports are in fluid communication with the tank and positioned at a bottom surface of the tank. Each set of liquid outlets comprises a first port and a second port, the first port being positioned upstream along the flow path relative to the second port. A fluid passage is in fluid communication with the first port and the second port. The fluid passage defines a secondary flow path adjacent to the horizontal tank, where the first port acts as a draft inlet to the secondary flow path and the second port acts as a draft outlet from the secondary flow path to the tank.

According to another aspect, the flow barrier comprises at least one of particulate matter and vertical baffles that redirect the flow path through the tank.

According to another aspect, the flow barrier comprises at least one vertical baffle, the at least one vertical baffle being spaced from each set of liquid ports such that the vertical baffle does not separate the first and second port.

According to another aspect, an inner diameter of the first port is at least two times or four time larger than an inner diameter of the second port.

According to another aspect, the secondary flow path comprises at least one collecting tank that collects liquid and has a liquid drain.

According to another aspect, the secondary flow path comprises a first collecting tank in communication with the first port and a second collecting tank in communication with the second port, the fluid passage connecting the first collecting tank and the second collecting tank. The fluid passage may have a passage inlet in the first tank and a passage outlet in the second tank, and wherein at least one of the passage inlet and the passage outlet are oriented downward. The first port may comprise a pipe section that extends downward into the first tank. Each of the first tanks and the second tank may comprise a liquid drain.

According to an aspect, there is provided a method of extracting liquid from a gas stream having entrained liquids, comprising the steps of, providing: a horizontal tank having a fluid inlet, a fluid outlet spaced horizontally along the horizontal tank from the fluid inlet, the horizontal tank defining a flow path within the tank between the fluid inlet and the fluid outlet and having a flow barrier disposed within the tank and distributed along the flow path between the inlet and the outlet; and one or more sets of liquid ports in fluid communication with the tank and positioned at a bottom surface of the tank, each set of liquid outlets comprising a first port and a second port, the first port being positioned upstream along the flow path relative to the second port, and a fluid passage in fluid communication with the first port and the second port, the fluid passage defining a secondary flow path adjacent to the horizontal tank, where the first port acts as a draft inlet to the secondary flow path and the second port acts as a draft outlet from the secondary flow path to the tank; pumping gas having entrained liquid to pass through the horizontal tank from the fluid inlet to the fluid outlet; and causing a portion of the gas to flow from the horizontal tank through the first port, through the fluid passage and re-enter the horizontal tank through the second port such that a portion of the entrained liquid separates from the gas.

According to another aspect, the flow barrier comprises at least one of particulate matter and vertical baffles that redirect the flow path through the tank.

According to another aspect, the flow barrier comprises at least one vertical baffle, the at least one vertical baffle being spaced from each set of liquid ports such that the vertical baffle does not separate the first and second port.

According to another aspect, an inner diameter of the first port is at least two times or four times larger than an inner diameter of the second port.

According to another aspect, the secondary flow path comprises at least one collecting tank that collects liquid and has a liquid drain.

According to another aspect, the secondary flow path comprises a first collecting tank in communication with the first port and a second collecting tank in communication with the second port, the fluid passage connecting the first collecting tank and the second collecting tank. The fluid passage may have a passage inlet in the first tank and a passage outlet in the second tank, and wherein at least one of the passage inlet and the passage outlet are oriented downward. The first port may comprise a pipe section that extends downward into the first tank. Each of the first tanks and the second tank may comprise a liquid drain.

These and other aspects that are apparent from the drawings and description herein may be combined in any reasonable combination as will be recognised by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 2:
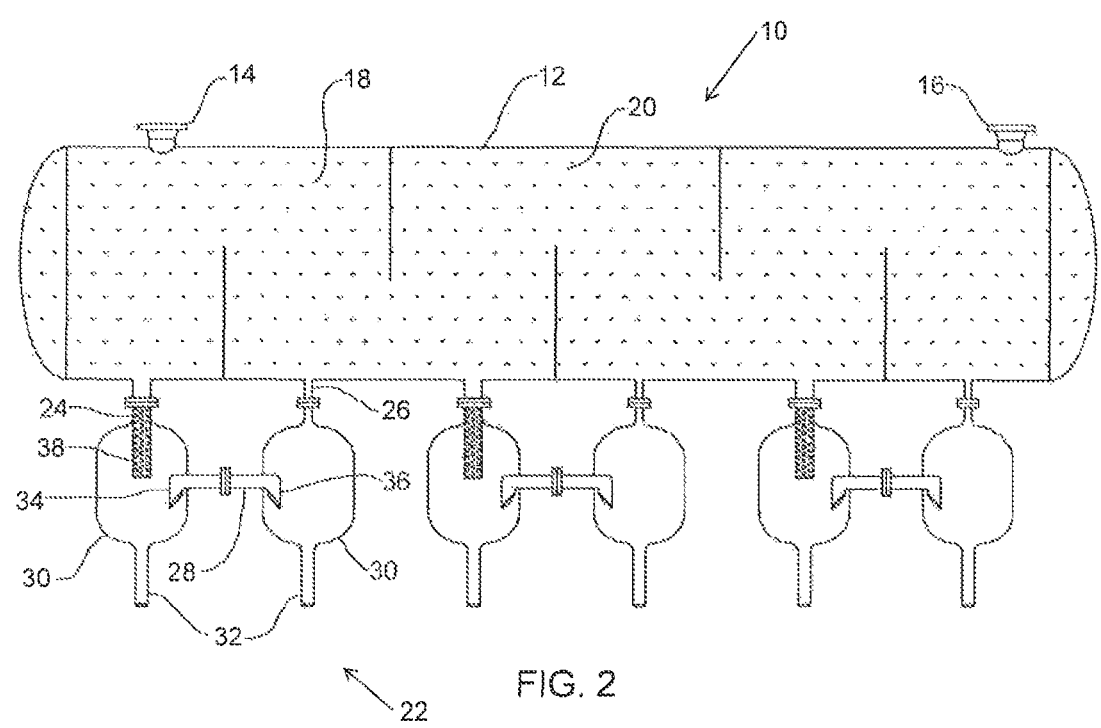
FIG. 2 is a side elevation view in section of an alternate separator tank.
Figure 3:
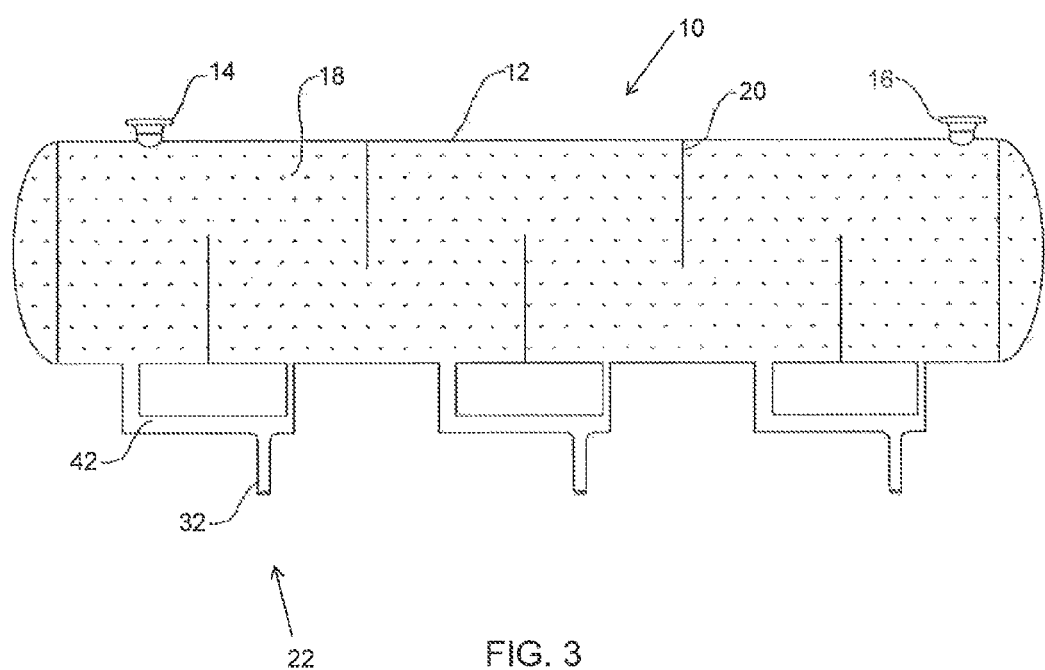
FIG. 3 is a side elevation view in section of a further alternative separator tank.
Figure 4:
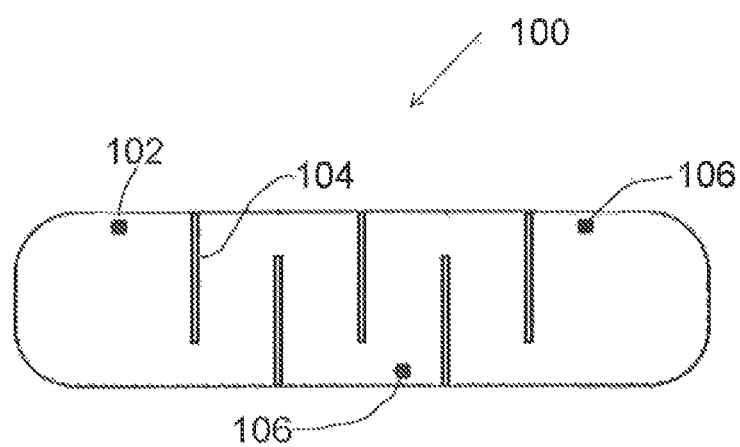
FIG. 4 is a prior art horizontal separator.

A separator tank generally identified by reference numeral 10 will now be described with reference to FIG. 1 through 3.

Figure 1:
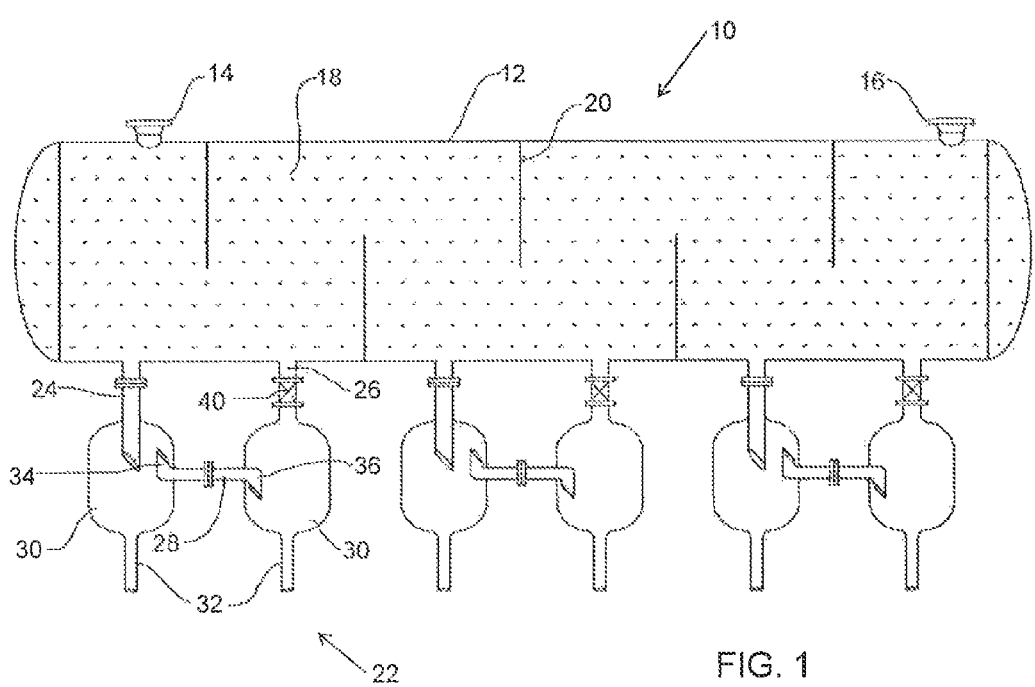
FIG. 1 is a side elevation view in section of a separator tank.

Referring to FIG. 1, separator 10 is intended to be used with a gas stream that has entrained liquids to be removed. In the case of gas from a hydrocarbon well, the gas is primarily a hydrocarbon gas and entrains liquids such as water, liquid hydrocarbons, etc. In some situations, the fluid flow from a hydrocarbon well may have already passed through other separation vessels or apparatuses, such as to remove some solid and liquids prior to passing the fluid flow through separator 10. In some circumstances, the gas and liquid may be from a difference source other than a well that may also have a gas flow with entrained fluids. The design of separator 10 is intended to enhance the removal of entrained liquids compared to other types of horizontal separators, such as the prior art design shown in FIG. 3.

Separator 10 has a horizontal tank 12 with a fluid inlet 14 and a fluid outlet 16 at the other end of tank 12. As shown, tank 12 is preferably a cylindrical tank with rounded ends with an axis that is oriented horizontally as is common in the art, although it will be understood that the actual design of tank 12 may be varied. As such, inlet 14 and outlet 16, which are positioned at either end of tank 12, will be spaced horizontally from each other. Tank 12 defines a flow path between fluid inlet 14 and fluid outlet 16. One or more flow barriers are disposed within tank 12 and distributed along the flow path between inlet 14 and outlet 16. As shown, the flow barriers preferably include a particulate material 18 that fills tank 12, such as gravel, and vertical baffles 20 that extend alternatingly from the top and bottom of tank 12 to create a serpentine flow path. While both are shown in the preferred embodiment, it will be understood that one or both may be used, or other types of barriers could also be included. By providing these flow barriers, the pressure in tank 12 is reduced along its length, creating a pressure gradient between inlet 14 and outlet 16. In addition, flow barriers 18 and 20 also help remove any entrained liquids.

There are preferably a number, but at least one, set of liquid ports, generally indicated by reference numeral 22. Sets of liquid ports 22 are in fluid communication with tank 12 and positioned on the bottom of tank 12. This allows them to remove any liquids from tank 12 that are knocked out of the gas flow. Each set of liquid outlets 22 includes a first port 24 and a second port 26. First port 24 is positioned upstream along the flow path of second port 26 and a fluid passage 28 is in fluid communication between first port 24 and second port 26. Fluid passage 28 defines a secondary flow path that is adjacent and in parallel with horizontal tank 12 for a short distance. It will be understood that the secondary flow path may not be parallel in the entirety of its flow, but rather with respect to first and second ports 24 and 26 being common start and end points. As first and second ports 24 and 26 are in communication with tank 12 and by fluid passage 28, the pressure differential along the length of tank 12 induces a draft between first and second ports 24 and 26, where first port 24 is at a higher pressure than second port 26, and does not have the same flow barriers as are found in tank 12. In one embodiment, a travel distance of about 6 feet between ports 24 and 26 provided adequate results.

As designed, first port 24 acts as a draft inlet for a certain amount of gas flow to be drawn off the bottom of tank 12, flow through fluid passage 28 and re-enter tank 12 through second port 26 which acts as a draft outlet for the secondary flow path. In order to facilitate this, first port 24 is preferably larger than second port 26. For example, first port 24 may be at least twice as large, or four times as large, as second port 26. In one embodiment, beneficial results were achieved where the size of first port 24 was 2 inches and second port 26 was ⅜ inches as in the embodiment of FIG. 2. However, referring to FIG. 1, an adjustable valve 40 may be included, which will allow a user to adjust the size of second port 26. While not shown, it may also be desirable to provide first port 24 with an adjustable valve. In some embodiments, as shown in FIG. 2, vertical baffles 20 may be spaced from ports 24 and 26 such that they are not positioned between any particular pair of ports. In other embodiments, vertical baffles 20 may be positioned between ports 24 and 26. This increases the travel distance between ports 24 and 26 and therefore increase the pressure differential, which may be desirable in some circumstances. In addition, as port 24 acts as a draft inlet, this may help remove liquid that falls out of the fluid stream before the respective baffle 20.

As shown, each fluid passage 28 only connects one pair of ports 24 and 26. If this were not so, it would change the characteristics of the draft and parallel flow that is otherwise achieved. Preferably, referring to FIGS. 1 and 2, there are collection tanks 30 associated with each port 24 and 26, although there may only be one tank 30, or it may be a single pipe 42, as shown in FIG. 3. Referring to FIG. 1, as the main collection points for liquid, collection tanks 30 also have liquid drains 32, which may be opened as necessary to withdraw any collected liquid. Liquid drains 32 are preferably dump valves that prevent gas flowing into tanks 30 from below, as known in the art. The liquid removed through drains 32 may be treated further as is known in the art. Using collection tanks 30, which have a larger cross-sectional flow area than inlet port 24, the fluid flow along the secondary flow path is slowed further. In addition, inlet port 24 extends downward into the first collection tank 30 and fluid passage 28 has a passage inlet port 34 and passage outlet port 36 that face downward, such that the flow path along the secondary flow path is more circuitous, as can be seen. These design features are intended to slow and redirect the direction of fluid flow to increase the opportunity for liquid to be removed from the gas flow to be collected in collection tanks 30. In another embodiment, referring to FIG. 2, the portion of inlet port 34 that extends into collection tank 30 includes a perforated section 38 to also attempt to increase the dispersion of the fluid flow.

Once the gas flow has traversed tank 12 and set of liquid ports 22, it exits tank 12 and may then be In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A method of extracting liquid from a gas stream having entrained liquids, comprising:
providing:
a horizontal tank having a fluid inlet, a fluid outlet spaced horizontally along the horizontal tank from the fluid inlet, the horizontal tank defining a flow path within the tank between the fluid inlet and the fluid outlet and having a flow barrier disposed within the tank and distributed along the flow path between the inlet and the outlet; and
one or more sets of liquid ports in fluid communication with the tank and positioned at a bottom surface of the tank, each set of liquid ports comprising a first port and a second port, the first port being positioned upstream along the flow path relative to the second port, and a fluid passage in fluid communication with the first port and the second port, the fluid passage defining a secondary flow path adjacent to the horizontal tank, where the first port acts as a draft inlet to the secondary flow path and the second port acts as a draft outlet from the secondary flow path to the tank;
pumping gas having entrained liquid to pass through the horizontal tank from the fluid inlet to the fluid outlet;
causing a portion of the gas to flow from the horizontal tank through the first port, through the fluid passage and re-enter the horizontal tank through the second port such that a portion of the entrained liquid separates from the gas; and
draining the separated liquid from the secondary flow passage and continuing to cause the portion of the gas to flow through the fluid passage wherein the flow barrier comprises particulate matter, vertical baffles, or particulate matter and vertical baffles in combination, the vertical baffles redirecting the flow path through the tank; wherein the secondary flow path comprises a first collecting tank in communication with the first port and a second collecting tank in communication with the second port, the fluid passage connecting the first collecting tank and the second collecting tank; wherein the first port comprises a pipe section that extends downward into the first collecting tank; wherein each of the first collecting tank and the second collecting tank comprises a liquid drain.

2. The method of claim 1, wherein the flow barrier comprises at least one vertical baffle, the at least one vertical baffle being spaced from each set of liquid ports such that the vertical baffle does not separate the first and second port.

3. The method of claim 1, wherein an inner diameter of the first port is at least two times larger than an inner diameter of the second port.

4. The method of claim 1, wherein an inner diameter of the first port is at least four times larger than an inner diameter of the second port.

5. The method of claim 1, wherein the secondary flow path comprises at least one collecting tank that collects liquid and has a liquid drain.

6. The method of claim 1, wherein the fluid passage has a passage net in the first collecting tank and a passage outlet in the second collecting tank, and wherein at least one of the passage net and the passage outlet are oriented downward.

7. A method of extracting liquid from a gas stream having entrained liquids, comprising the steps of:
providing:
a horizontal tank having a fluid inlet, a fluid outlet spaced horizontally along the horizontal tank from the fluid inlet, the horizontal tank defining a flow path within the tank between the fluid inlet and the fluid outlet and having a flow barrier disposed within the tank and distributed along the flow path between the inlet and the outlet, the flow barrier comprising particulate matter, the flow path passing through the particulate matter; and
one or more sets of liquid ports in fluid communication with the tank and positioned at a bottom surface of the tank, each set of liquid ports outlets comprising a first port and a second port and a fluid passage in fluid communication with the first port and the second port, the first port being positioned upstream along the flow path and upstream of at least a portion of the flow barrier relative to the second port, and the fluid passage defining a secondary flow path adjacent to the horizontal tank, where the first port acts as a draft inlet to the secondary flow path and the second port acts as a draft outlet from the secondary flow path to the tank;
pumping gas having entrained liquid to pass through the horizontal tank from the fluid inlet to the fluid outlet; and
causing a portion of the gas to flow from the horizontal tank through the first port, through the fluid passage and re-enter the horizontal tank through the second port such that a portion of the entrained liquid separates from the gas; and
draining the separated liquid from the secondary flow passage and continuing to cause the portion of the gas to flow through the fluid passage wherein the flow barrier comprises particulate matter, vertical baffles, or particulate matter and vertical baffles in combination, the vertical baffles redirecting the flow path through the tank; wherein the secondary flow path comprises a first collecting tank in communication with the first port and a second collecting tank in communication with the second port, the fluid passage connecting the first collecting tank and the second collecting tank; wherein the first port comprises a pipe section that extends downward into the first collecting tank; wherein each of the first collecting tank and the second collecting tank comprises a liquid drain.

* * * * *